UNITED STATES PATENT OFFICE.

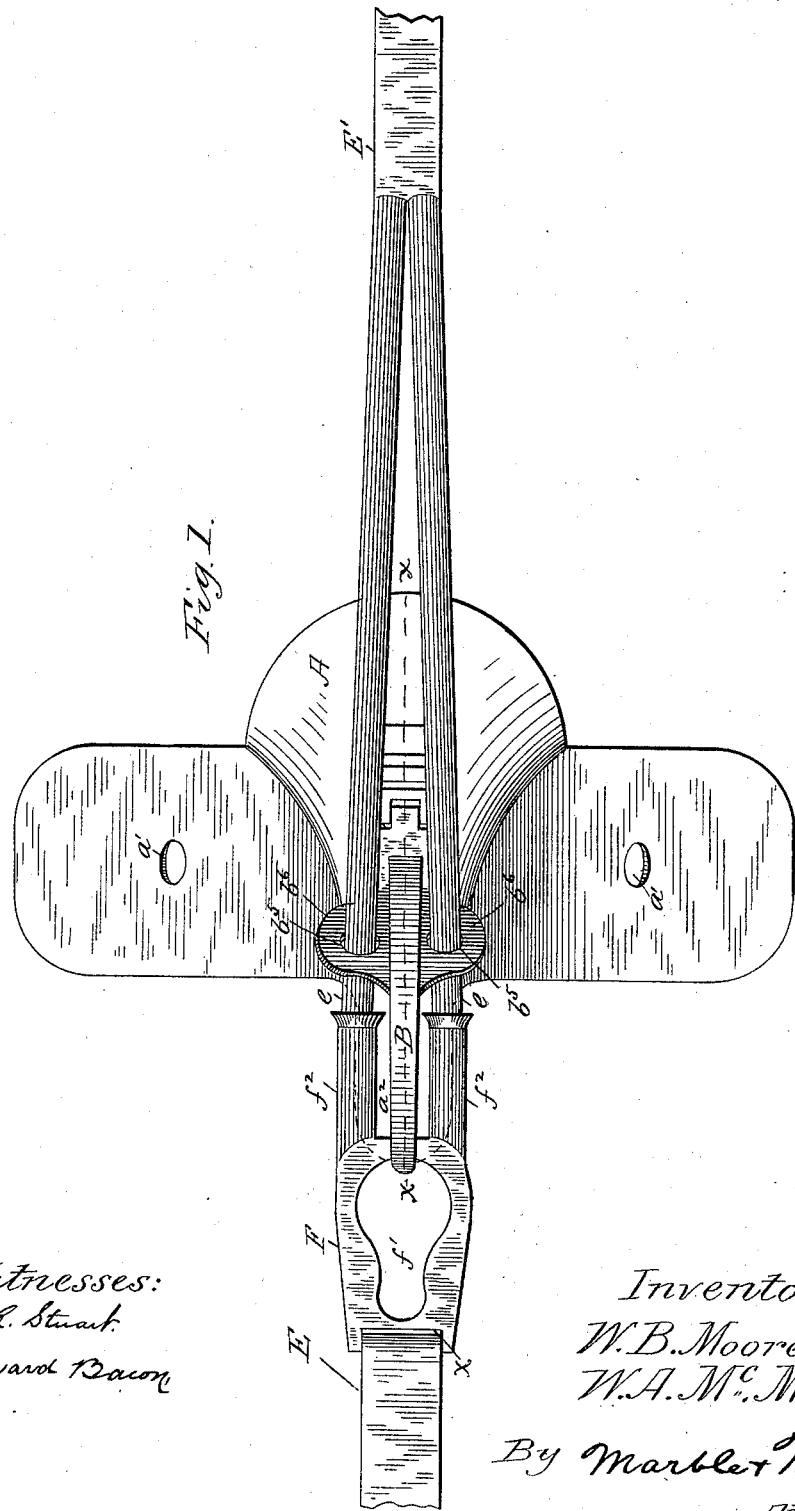

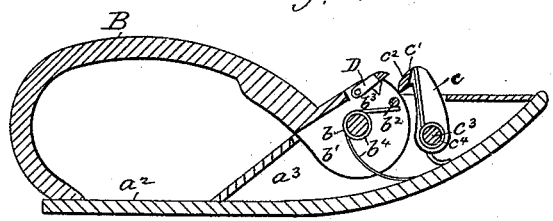
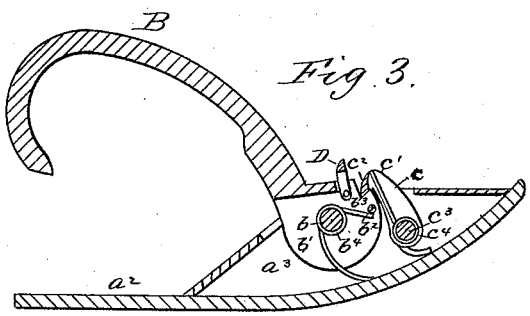
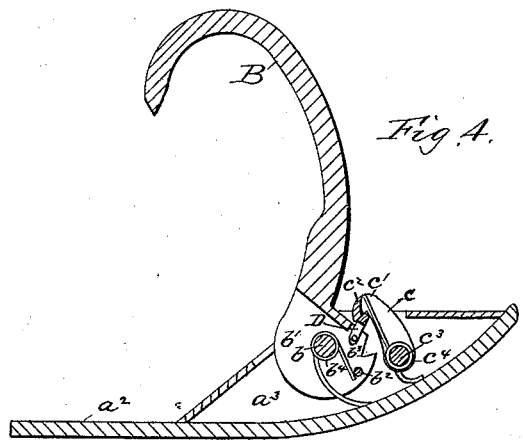

WILLIAM B. MOORE, OF EAST SAGINAW, AND WILLIAM A. McMANN, OF SAGINAW, MICHIGAN.

CHECKREIN-HOLDER.

SPECIFICATION forming part of Letters Patent No. 371,964, dated October 25, 1887.

Application filed August 18, 1887. Serial No. 247,243. (No model.)

*To all whom it may concern:*

Be it known that we, WILLIAM B. MOORE and WILLIAM A. McMANN, citizens of the United States, residing, respectively, at East Saginaw and Saginaw, in the county of Saginaw and State of Michigan, have invented certain new and useful Improvements in Checkrein-Holders for Harness; and we do hereby declare the following to be a full, clear, and exact description of the invention, such as will enable others skilled in the art to which it appertains to make and use the same.

Our invention relates to checkrein-holders for harness which are to be operated by the driver from his seat to release or recheck the animal when it is desired to give it the free use of its head while drinking, resting, or climbing hills.

The invention consists in certain novel constructions and combinations of parts for actuating a pivoted check-hook to raise said hook when the check-line is to be released and support said hook in its raised position until the rein is rechecked, as hereinafter fully disclosed in the description and claims.

In the accompanying drawings, forming a part of this specification, and in which the same reference-letters indicate the same or corresponding parts, Figure 1 is a plan of my improvement applied to a harness-saddle; Fig. 2, a section on the line $x\ x$ of Fig. 1; Fig. 3, a broken detail of part of the saddle, showing the pivoted check-hook raised and supported to release the check-line; and Fig. 4, a similar detail showing the hook raised a farther distance, so as to be released from the device for supporting it in the position shown in Fig. 3.

A harness-saddle, A, is provided in the ordinary manner with a crupper-loop (not shown) for the back-strap, and with holes $a'$ for the terret-shanks, and in this instance with an extra-sized jaw, $a^2$, extending forwardly to form a bearing for the forward end of the check-hook B, the rear end of said hook being pivoted upon a pin, $b$, in a raised boxing, $a^3$, formed upon the top of the saddle-tree. The boxing $a^3$ provides an extended bearing upon both sides of the enlarged pivoted end of the hook B, and serves also to inclose said end, its connections, and the springs for actuating them. The pivoted end of the hook B is broadened and has ears $b'$ upon its sides, which extend downwardly into the boxing $a^3$ and are pivoted upon a pin, $b$, which is supported within the said boxing. Around said pin a coiled spring, $b^4$, is supported, one end of which bears against the bottom of the boxing, and the other end presses beneath a pin, $b^5$, supported upon the ears $b'$ of the hook B, thus holding said hook to bear at its forward end against the jaw $a^2$ of the saddle and securely hold the checkrein. The ears $b'$ of the hook B are notched at $b^3$ to engage with a dog, $c$, having hook-shaped side pieces, $c'$, connected by a cross-plate, $c^2$, and supported upon a pivot-pin, $c^3$, which is secured across the boxing $a^3$.

A coil-spring, $c^4$, supported upon the pin $c^3$, presses with one end against the boxing and with its other end against the cross-plate $c^2$ of the dog $c$, and serves to hold the jaws of the dog against the ears $b'$ of the check-hook B, to engage with the notches $b^3$ and hold said check-hook up when the check-line is released.

A switch-plate, D, is hinged to and extends across the rear end of the check-hook B above the notches $b^3$, to overlie them when the check-hook is held down and to be pushed out of the way by the dog $c$ when the check-hook is drawn back to the position shown in Fig. 3 and allow the said dog to engage with the notches to hold the hook in its raised position. By a further backward movement of the check-hook B to the position shown in Fig. 4 the dog $c$ is pushed up over the switch-plate D, and pulls the said switch-plate back with it to cover the notches in the check-hook and permit the dog $c$ to return to its normal position, (shown in Fig. 2,) wherein the check-hook is held down by its spring to recheck the rein.

The check-rein E is buckled to a plate, F, having a strap-hole, $x$, at its forward end, a check-hook opening, $f'$, at its middle portion, and tubular extensions $f^2\ f^2$ at its rear end, into which are riveted the ends of thongs $e\ e$ of a strap, E', which can be attached to any part of the carriage or to one of the driving-reins, so as to be under the control of the driver from his seat.

The thongs $e\ e$ of the strap E' pass freely through holes $b^5\ b^5$ in ears $b^6\ b^6$, extending from opposite sides of the check-hook B, and permit the ends of the tubular extensions $f^2\ f^2$ upon the checkrein-plate F to bear against the ears $b^6\ b^6$ of the check-hook and lift it up to engage with the dog $c$ when it is desired to hold it in the position shown in Fig. 3 or to raise to the position shown in Fig. 4, when the check-hook is to be restored to its closed position.

The check-hook may thus be operated in a simple manner, and the checkrein-plate may be held securely by the check-hook or released therefrom by simple movements of the strap extending backward to within reach of the driver.

Having thus fully described our invention, what we claim as new is—

1. In a checkrein-holder, the combination, with the boxing of the saddle-tree and the pivoted check-hook having notches at its end, of a pivoted dog pivoted in said boxing in rear of said check-hook and adapted to engage with said notches to hold the hook in its raised position, and the check-line for raising the hook and releasing the dog, substantially as described.

2. In a checkrein-holder, in combination, the pivoted check-hook having notches at its end, a pivoted dog to engage with said notches, a switch-plate hinged to the hook, and a strap for actuating said check-hook, substantially as described.

3. The combination, in a checkrein-holder, of the pivoted check-hook supported in its raised position by a pivoted dog and having laterally-projecting perforated ears, a double-thonged strap adapted to pass through said perforated ears, and a checkrein-plate secured to the ends of the said thongs to abut against the ears of the check-hook, substantially as described.

4. In a checkrein-holder, the combination, with the saddle-tree having a forwardly-projecting jaw, of the pivoted check-hook, the checkrein, the checkrein-plate having a check-hook opening, and a double-thonged strap secured to said checkrein-plate and passing through ears projecting from the check-hook, substantially as described.

5. In a checkrein-holder, the combination, with the saddle-tree A, having the boxing $a^3$, of the check-hook B, having ears $b'$ and notches $b^3$, the pin $b^2$, the dog $c$, pivoted to a pin, $c^3$, springs $b^4\ c^4$, inclosed within said boxing, and means for raising and lowering the check-hook, substantially as described.

6. In a checkrein holder, the combination, with the saddle-tree A, having the boxing $a^3$, of the spring-actuated check-hook B, a spring-actuated dog, $c$, pivoted within said boxing, the switch-plate D, hinged to the check-hook above notches formed therein and adapted to overlie said notches when the dog is released therefrom and the check-hook is closed, substantially as described.

In testimony whereof we affix our signatures in presence of two witnesses.

WM. B. MOORE.
WILLIAM A. McMANN.

Witnesses:
WM. T. WICKWAAL,
JOHN F. SPINDLER.